US005548952A

United States Patent [19]
Stock et al.

[11] Patent Number: 5,548,952
[45] Date of Patent: Aug. 27, 1996

[54] HYDROGEN JET-PHASE ENGINE

[76] Inventors: Theodore Stock, 250 Rosery Rd. NW. #264, Largo, Fla. 34640-1221; George Spector, 233 Broadway Rm 702, New York, N.Y. 10279

[21] Appl. No.: 293,454

[22] Filed: Aug. 22, 1994

[51] Int. Cl.⁶ .............................. F02G 1/00; F02G 3/00; F02C 3/22; F02C 7/00
[52] U.S. Cl. ................. 60/39.465; 60/39.55; 60/39.75
[58] Field of Search ................. 60/39.465, 39.55, 60/39.75; 415/218.1

[56]  References Cited

U.S. PATENT DOCUMENTS

| 1,160,145 | 11/1915 | Davis | 60/39.55 |
| 2,916,877 | 12/1959 | Walter | 60/39.55 |
| 3,984,193 | 10/1976 | Yu | 415/218.1 |
| 4,148,185 | 4/1979 | Somers | 60/39.465 |
| 4,345,729 | 8/1982 | Barter | 60/39.465 |
| 4,884,529 | 12/1989 | Byrnes | 60/39.55 |
| 5,331,806 | 7/1994 | Warkentin | 60/39.465 |

*Primary Examiner*—Richard A. Bertsch
*Assistant Examiner*—Ted Kim

[57] ABSTRACT

A hydrogen gas jet pulse engine comprising a turbine assembly operatively connected to a generator. A manifold extension having a combustion chamber is in communication with a forward end of the turbine assembly. The employment of a mixture of hydrogen gas and oxygen gas into the combustion chamber will produce steam when lighted to drive the turbine assembly.

1 Claim, 1 Drawing Sheet

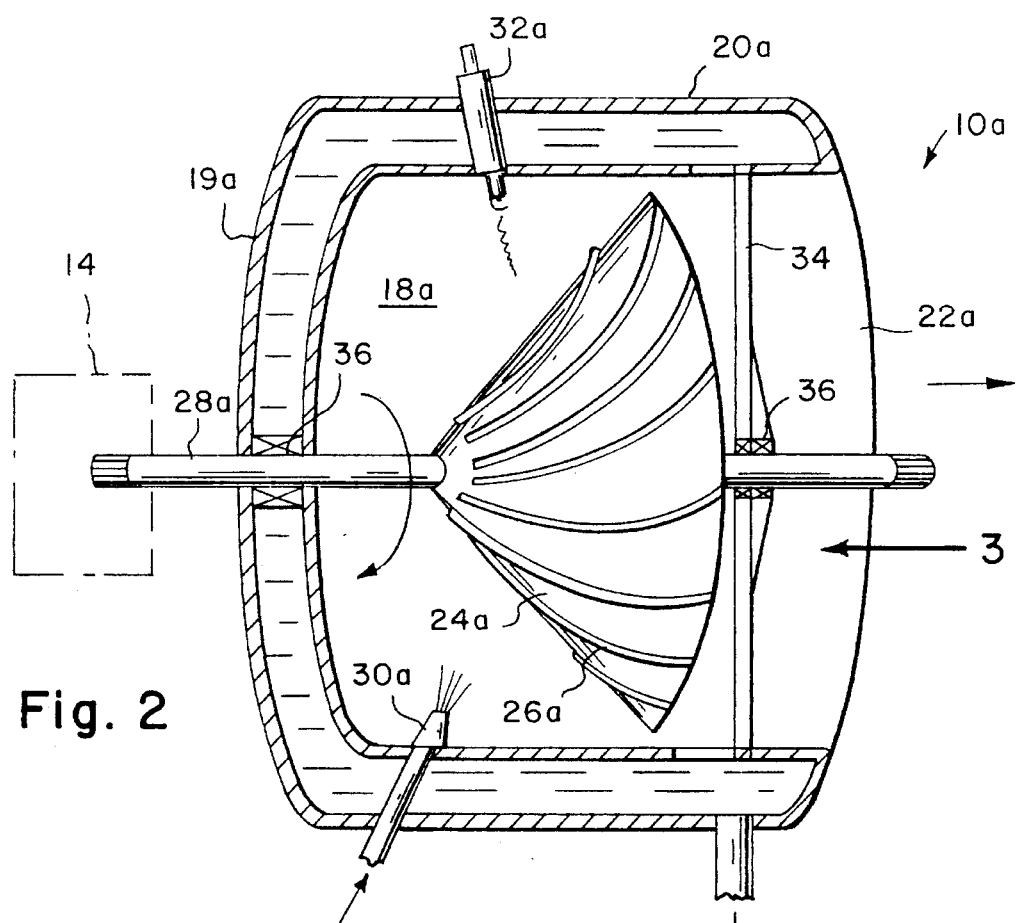
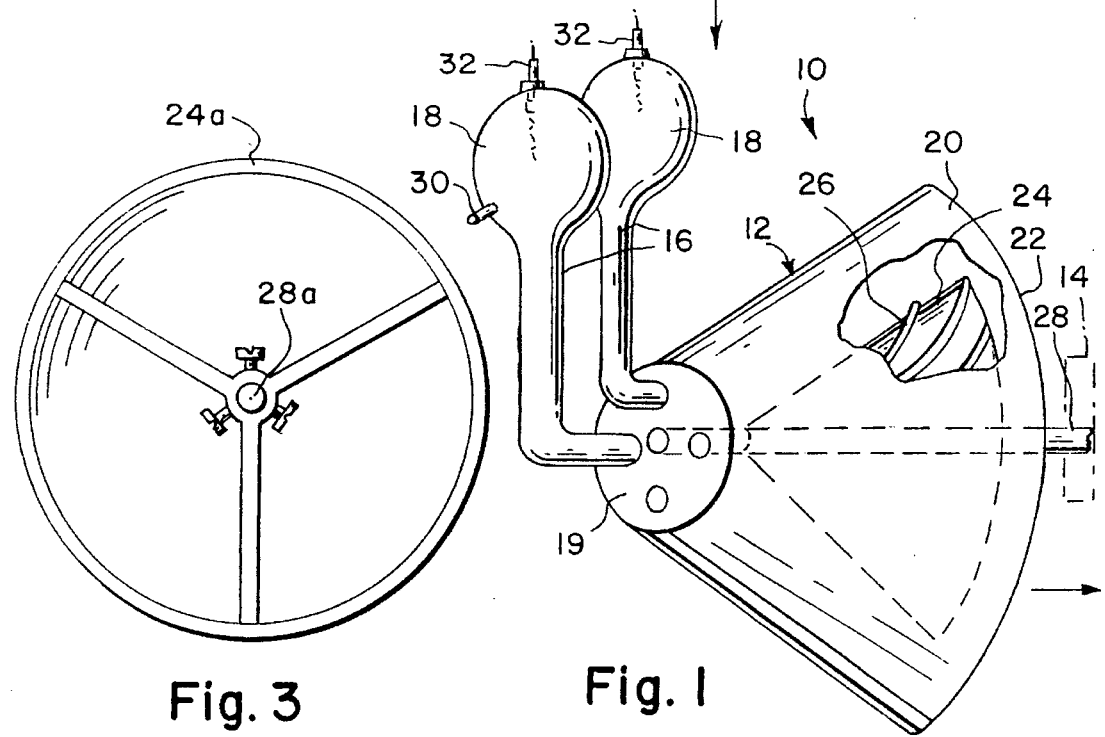

5,548,952

HYDROGEN JET-PHASE ENGINE

BACKGROUND OF THE INVENTION

The instant invention relates generally to hydrogen gas driven turbines and more specifically it relates to a hydrogen gas jet pulse engine, which provides a safe usage of hydrogen gas with oxygen gas as the combustion fuel.

There are available various conventional hydrogen gas driven turbines which do not provide the novel improvements of the invention herein disclosed.

SUMMARY OF THE INVENTION

A primary object of the present invention is to provide a hydrogen gas jet pulse engine that will overcome the shortcomings of the prior art devices.

Another object is to provide a hydrogen gas jet pulse engine that uses in a safe way the combination of hydrogen gas with oxygen gas as the combustion fuel for the engine, instead of burning of petroleum fuels.

An additional object is to provide a hydrogen gas jet pulse engine in which the exhaustable by product will be steam that will turn into water, thereby being better for the environment and will not pollute the atmosphere.

A further object is to provide a hydrogen gas jet pulse engine that is simple and easy to use.

A still further object is to provide a hydrogen gas jet pulse engine that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view with parts broken out of a first embodiment of the instant invention.

FIG. 2 is a cross sectional view of a second embodiment of the instant invention.

FIG. 3 is an end view of the turbine wheel per se taken in the direction of arrow 3 in FIG. 2.

DETAILED DESCRIPTION OF THE PREFERRED EMBODIMENTS

Turning now descriptively to the drawings, in which similar reference characters denote similar elements throughout the several views, FIG. 1 illustrates a hydrogen gas jet pulse engine 10 comprising a turbine assembly 12 operatively connected to a generator 14. A manifold extension 16 has a combustion chamber 18 in communication with a forward end 19 of the turbine assembly 12. The employment of a mixture of hydrogen gas and oxygen gas into the combustion chamber 18 will produce steam when lighted to drive the turbine assembly 12.

The turbine assembly 12 includes a cone-shaped stationary housing 20 having an exhaust port 22 at a rearward end. A cone-shaped turbine wheel 24 has a plurality of curved vanes 26 radially mounted thereon. A power take off shaft 28 is affixed to the turbine wheel 24 and is rotatively connected to the housing 20. The generator 14 is connected to one end of the shaft 28 extending from the housing 20.

The manifold extension 16 contains an inlet tube 30 for carrying the mixture of hydrogen gas and oxygen gas into the combustion chamber 18. A spark plug 32 is for igniting the mixture of hydrogen gas and oxygen gas in the combustion chamber 18.

FIG. 2 shows a modified hydrogen gas jet pulse engine 10a comprising a stationary water cooled housing 20a having a combustion chamber 18a at a forward end 19a and an exhaust port 22a at a rearward end. A cone-shaped turbine wheel 24a has a plurality of curved vanes 26a radially mounted thereon. A power take off shaft 28a is affixed to the turbine wheel 24a (see FIG. 3) and is rotatively connected to the housing 20a via a brace 34 and bearings 36. A generator 14 is connected to one end of the shaft 28a extending from the housing 20a. A fuel nozzle 30a extends into the housing 20a at the combustion chamber 18a for spraying a mixture of hydrogen gas and oxygen gas into the combustion chamber 18a. An igniter 32a extends into the housing 20a at the combustion chamber 18a opposite from the fuel nozzle 30a, for igniting the mixture of hydrogen gas and oxygen gas in the combustion chamber 18a, thereby producing steam to rotate the turbine wheel 24a and the shaft 28a to operate the generator 14.

OPERATION OF THE INVENTION

As shown in FIG. 1, a mixture of hydrogen gas and oxygen gas is carried by the inlet tube 30 into the combustion chamber 18. The spark plug 32 will ignite the mixture to produce steam to drive the turbine assembly 12 and open the generator 14.

As shown in FIG. 2, a mixture of hydrogen gas and oxygen gas is sprayed into the combustion chamber 18a by the fuel nozzle 30a. The igniter 32a will ignite the mixture to produce steam to rotate the turbine wheel 24a and the shaft 28a to operate the generator 14.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A hydrogen gas jet pulse engine comprising:

a) a stationary water cooled housing with inlet and outlet having a combustion chamber within a forward end and an exhaust port within a rearward end within said housing;

b) a cone-shaped turbine wheel between said ends having a central longitudinal axis with a plurality of curved vanes radially mounted thereon within said forward end;

c) said wheel having a peripheral edge spaced from said housing, a power take off shaft affixed to said turbine wheel along said axis and rotatively mounted on said housing, including a generator connected to one end of said shaft extending from said housing;

d) a fuel nozzle extending into said housing at the combustion chamber for spraying a mixture of hydrogen gas and oxygen gas into the combustion chamber and e) an igniter extending into said housing at the combustion chamber opposite from said fuel nozzle for igniting the mixture of hydrogen gas and oxygen gas in the combustion chamber, thereby producing steam to rotate said turbine wheel and said shaft to operate the generator and whereby products of combustion escape from said combustion chamber through the space about said peripheral edge to said exhaust port.

* * * * *